(12) United States Patent
Pricken

(10) Patent No.: US 11,365,802 B2
(45) Date of Patent: Jun. 21, 2022

(54) TRANSMISSION HAVING EXTERNAL SHIFTING MASS

(71) Applicant: GETRAG FORD TRANSMISSIONS GMBH, Cologne (DE)

(72) Inventor: Frank Pricken, Krefeld (DE)

(73) Assignee: GETRAG FORD Transmissions GmbH, Cologne (DE)

( * ) Notice: Subject to any disclaimer, the term of this patent is extended or adjusted under 35 U.S.C. 154(b) by 142 days.

(21) Appl. No.: 16/762,996

(22) PCT Filed: Nov. 27, 2018

(86) PCT No.: PCT/EP2018/082675
§ 371 (c)(1),
(2) Date: May 11, 2020

(87) PCT Pub. No.: WO2019/105919
PCT Pub. Date: Jun. 6, 2019

(65) Prior Publication Data
US 2020/0400231 A1 Dec. 24, 2020

(30) Foreign Application Priority Data

Nov. 30, 2017 (DE) .......................... 102017128461.3

(51) Int. Cl.
*F16H 61/24* (2006.01)
*F16H 57/02* (2012.01)
(Continued)

(52) U.S. Cl.
CPC ............ *F16H 61/24* (2013.01); *F16H 57/02* (2013.01); *F16H 59/0278* (2013.01);
(Continued)

(58) Field of Classification Search
CPC ...... F16H 61/24; F16H 57/02; F16H 59/0278; F16H 59/04; F16H 63/30;
(Continued)

(56) References Cited

FOREIGN PATENT DOCUMENTS

| CN | 1603154 A | * | 4/2005 | ............. F16H 63/20 |
| CN | 109477574 A | * | 3/2019 | ............. F16H 63/20 |

(Continued)

OTHER PUBLICATIONS

English Translation of PCT/ISA/237 form for PCT EP/2018/082675 (Year: 2018).*

(Continued)

*Primary Examiner* — Victor L MacArthur
(74) *Attorney, Agent, or Firm* — Richard M. Goldberg

(57) ABSTRACT

A gearbox for a motor vehicle, includes multiple gears, a housing, an interior space enclosed by the housing, a gearshift clutch located in the interior space, through which a gear can be shifted, and a shifting device for transmitting an external actuating force acting outside the housing for shifting to the gearshift clutch, the shifting device having an inner shifting part in the interior space, a first introduction element which engages through a first opening provided in the housing for guiding the external actuating force to shift the gear to the inner shifting part, a shifting mass arranged outside the housing which is moved during gear shifting, and a connecting element different from the first introduction element with which the shifting mass is connected to the inner shifting part, the connecting element engaging through a second opening different from the first opening in the housing into the interior space.

3 Claims, 2 Drawing Sheets

(51) Int. Cl.
    *F16H 59/02*     (2006.01)
    *F16H 59/04*     (2006.01)
    *F16H 63/30*     (2006.01)

(52) U.S. Cl.
    CPC ............ *F16H 59/04* (2013.01); *F16H 63/30* (2013.01); *F16H 2057/02043* (2013.01); *F16H 2061/246* (2013.01); *F16H 2063/3076* (2013.01)

(58) Field of Classification Search
    CPC ..... F16H 2057/02043; F16H 2061/246; F16H 2063/3076; F16H 63/20
    See application file for complete search history.

(56) References Cited

FOREIGN PATENT DOCUMENTS

| | | | |
|---|---|---|---|
| DE | 19609209 A1 | 3/1996 | |
| DE | 202004006953 U1 | 9/2004 | |
| DE | 602006000454 T2 | 12/2008 | |
| DE | 102012000306 A1 | 7/2013 | |
| DE | 102013006084 A1 | 10/2014 | |
| DE | 102015112951 A1 | 2/2017 | |
| DE | 102017201100 A1 | 7/2017 | |
| EP | 1091149 A2 * | 4/2001 | ......... F16H 59/0208 |
| EP | 1686293 A1 | 8/2006 | |
| EP | 1717490 A2 | 11/2006 | |
| JP | 2008-128303 A | 6/2008 | |
| KR | 100802948 B1 * | 2/2008 | ............. F16H 61/24 |
| KR | 10-0802948 B1 | 12/2008 | |

OTHER PUBLICATIONS

MAGNA/GETRAG company brochure; pp. 1-36; Portfolio MT/DCT/HTD; Edition 2015 Internet PDF file Apr. 15, 2015_Getrag_Product Brochure_DE.PDF.

* cited by examiner

TRANSMISSION HAVING EXTERNAL SHIFTING MASS

BACKGROUND OF THE INVENTION

The invention relates to a manual gearbox for a motor vehicle, the manual gearbox comprising multiple gears, a housing, an interior space which is enclosed by said housing, at least one gearshift clutch located in the interior space, through which a gear can be shifted, and a shifting device which serves to direct an external actuating force acting outside said housing for shifting the gear to the gearshift clutch.

Such a manual gearbox is known for example from EP 1 686 293 A1. The shifting device of this gearbox has an inner shifting part located in the interior space of the manual gearbox and a first introduction element which serves to direct the external actuating force for shifting the gear to the inner shifting part. Furthermore, a shifting mass arranged outside the housing is provided, which is moved when the gear is shifted. Due to the inertia of the shifting mass, force peaks that can occur when shifting or engaging or disengaging the gear are smoothed out. The outer shifting mass is also connected to the inner shifting part by the first introduction element. Such a structure is also known in other manual gearboxes, wherein the introduction element engages through a first opening provided in the housing.

The first introduction element of EP 1 686 293 A1 has a receptacle in the form of a spherical head which can be connected to a shift linkage or the like in order to transmit the external actuating force to the first introduction element. Since the installation space for the manual gearbox is basically limited in a motor vehicle and many additional requirements have to be met, it can be difficult in a manual gearbox in which the shifting mass is linked to the introduction element and thus to the receptacle for introducing the external actuating force, to meet all requirements (especially packaging).

SUMMARY OF THE INVENTION

The invention is therefore based on the object of providing a manual gearbox which has a flexible design with regard to its structure and in particular with regard to the structure of its shifting device.

The object of the invention is achieved with the combination of features according to the independent claim. Exemplary embodiments of the invention can be found in the dependent claims.

According to the invention, it is provided that the shifting device has a connecting element which is different from the first introduction element with which the shifting mass which is arranged outside the housing, or the external shifting mass, is connected to the inner shifting part, the connecting element engaging through a second opening in the housing which is different from the first opening. This enables spatial separation of the first introduction element and the connecting element. They can therefore engage the interior space of the housing from the outside at different points. This spatial independence between the first introduction element, through which the external actuating force for shifting the gear is directed to the inner shifting part, and the connecting element, with which the shifting mass is connected to the inner shifting part, leads to the fact that the manual gearbox according to the invention has additional degrees of freedom with regard to its structure that can facilitate the fulfillment of different packaging requirements.

The housing can have an approximately cylindrical basic shape with a first end face, with a second end face and with a lateral surface connecting the first end face and the second end face, one of the two openings being arranged on the first end wall and the other of the two openings being arranged on the lateral surface. In an exemplary embodiment, the first opening, through which the first introduction element engages, is arranged on the first end wall, while the second opening for the connecting element is provided on the lateral surface. A reverse arrangement is also possible. It is also possible for the first opening and the second opening to be arranged on the lateral surface, but at a certain distance from one another.

The inner shifting part can be designed as a shift rod. The shift rod is completely housed in the interior of the gearbox. Alternatively, the inner shifting part can also only form an inner rod portion of the shift rod, in which case an outer rod portion of the shift rod protrudes from the housing.

In an exemplary embodiment, multiple mutually parallel shafts are rotatably mounted in the housing, the shift rod extending substantially parallel to the shafts. For example, it can be a so-called inline manual gearbox in which an input shaft and an output shaft are arranged coaxially with one another. A countershaft is axially spaced from the coaxial shafts. The first opening for the first introduction element can be provided on the end face of the housing, on which an output connected to the output shaft is provided.

The shifting device can be designed such that an axial displacement of the shift rod leads to an axial motion, in the same or opposite direction, of a sliding sleeve of the gearshift clutch, which is seated on one of the shafts in the gearbox. A gear can thus be engaged or disengaged through the axial displacement of the shift rod. It is also possible that, alternatively, a rotation of the shift rod causes an axial motion of the sliding sleeve, so that the gear can be engaged or disengaged by the rotation of the shift rod.

An axial displacement of the shift rod preferably leads to a rotation of the connecting element and to a rotary motion of the shifting mass. The rotation is preferably about an axis of rotation that coincides with a central axis of the second opening. The rotational moment of inertia of the shifting mass can be set via the distance between the shifting mass and the axis of rotation. Due to the inertia of the shifting mass, a shifting process introduced via the introduction element is smoothed out overall with regard to force peaks occurring due to the interaction of the connecting element and the inner shifting part or shift rod.

A rotary motion of the shift rod can also lead to a rotation of the connecting element and to a rotary motion of the shifting mass. The speed of the rotary motion of the shifting mass can correspond to or deviate from the speed of the rotary motion of the shift rod. The shifting mass preferably rotates faster (for example by a factor of 1.5 and larger) than the shift rod, so that the inertia of the shifting mass comes into its own.

The first introduction element can have a receiving part for the external actuating force for shifting the gear. For example, the receiving part may be a spherical head which is encompassed by a dome shaped cover. The receiving part can also be a lug into which a cable or a shift linkage can be hooked.

In an exemplary embodiment, an actuating force for selecting a different gear can also be introduced into the receiving part of the first introduction element. For example, an axial displacement of the first introduction element can lead to a gear shift, while a rotation of the introduction element will result in the selection of another gear of the manual gearbox. If another gear is selected, the inner shifting part located in the interior space changes its position (here the angle of rotation) in such a way that it no longer interacts with the gearshift clutch described above and in particular with the sliding sleeve of this gearshift clutch, but with another gearshift clutch that is also located in the interior space of the manual gearbox.

Alternatively, a second introduction element can be provided, which engages through a third opening in the housing and serves to direct the mentioned actuating force to the inner shifting part for selecting the other gear.

The first introduction element and the inner rod portion of the shift rod can be formed integrally or as a fixed mechanical unit. The introduction element can also be referred to as an outer rod portion of the shift rod. The shift rod engages through the first opening in the housing and extends from the outside through the housing into the interior of the gearbox.

BRIEF DESCRIPTION OF THE DRAWINGS

The invention is explained in more detail with reference to an exemplary embodiment shown in the drawing.

DETAILED DESCRIPTION

Figure 1:
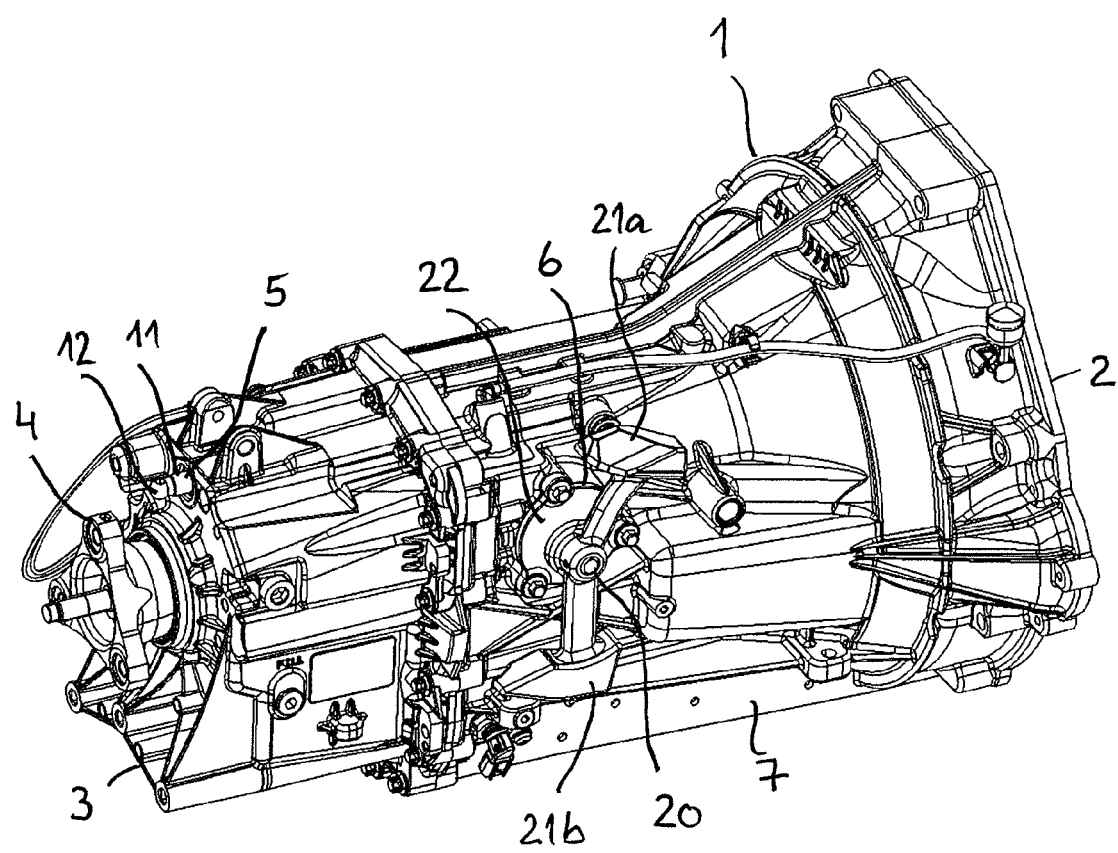
FIG. 1 shows a manual gearbox according to the invention.

FIG. 1 shows a perspective view of a multi-speed manual gearbox with a housing 1. The housing 1 has an engine-side end 2 and an output-side end 3. The housing 1 encloses an interior space of the gearbox, in which an input shaft, an output shaft and, in the present exemplary embodiment, a countershaft (each covered) are arranged. The shafts are parallel to each other, the input shaft and output shaft being arranged coaxially. The shafts extend from the motor-side end 2 in the direction of the output-side end 3.

Figure 2:
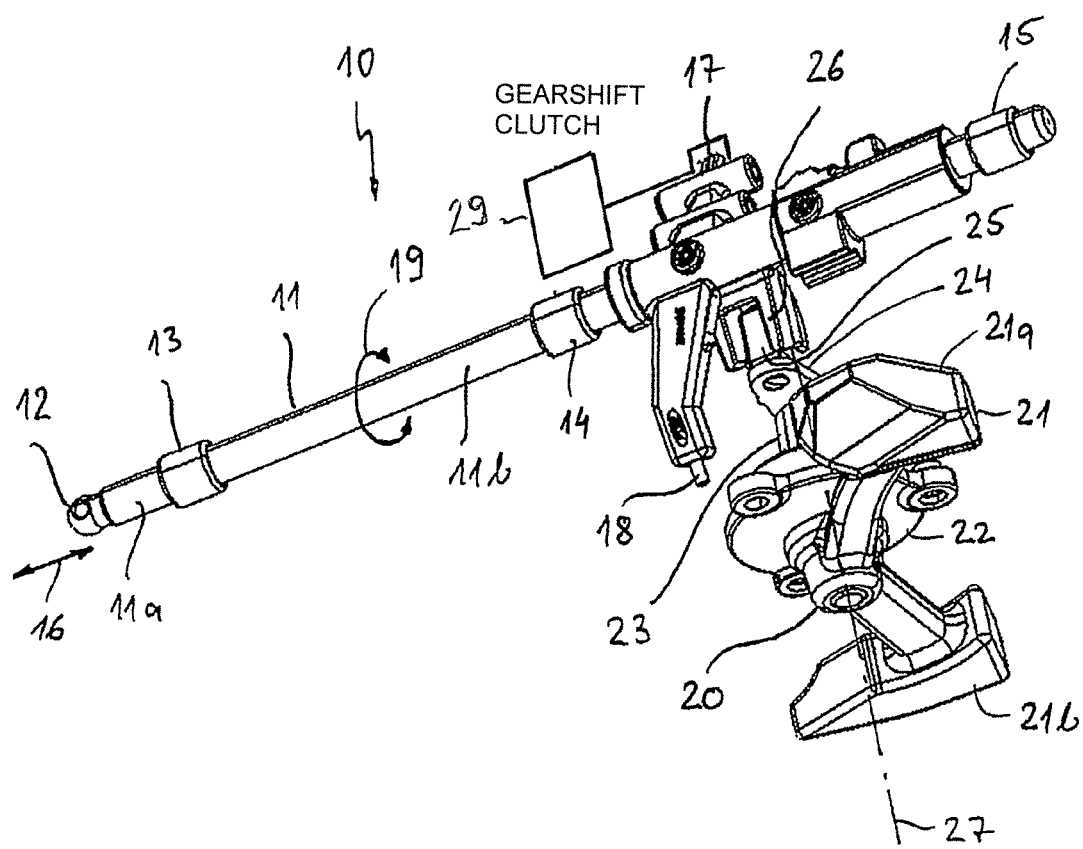
FIG. 2 shows part of the shifting device of the manual gearbox of FIG. 1.

The input shaft can be connected to a motor (not shown) via a clutch, while the output shaft is connected to an output 4. Several gearshift clutches, one of which is schematically shown by numeral 29 in FIG. 2, are arranged in the interior space, which serve to engage and disengage (shift) gears of the manual gearbox. Each of the gearshift clutches usually has a sliding sleeve, through the axial displacement of which a gear is shifted.

To shift a gear, an external actuating force acting outside the housing 1 is necessary, this external actuating force being directed via a shifting device to the gearshift clutches located in the interior space or to their sliding sleeves. FIG. 2 shows parts of this shifting device, which is designated in its entirety with 10.

At the output end 3, the housing 1 has a first opening 5 through which a shift rod 11 of the shifting device 10 engages. At an outer end, the shift rod 11 has a spherical head 12 through which the external actuating force for shifting the gear can be directed into the shift rod 11. As can be seen in particular in FIG. 2, the shift rod 11 has an outer rod portion 11a and an inner rod portion 11b located in the interior space. In FIG. 1, only the outer rod portion 11a with the ball head 12 can be seen. Bearings of the shift rod 11 are designated 13, 14, 15, the bearing 13 coinciding with the first opening 5. The outer rod portion 11a can also be referred to as a first introduction element which engages through the first opening 5 and directs the external actuating force for shifting the gear to the inner rod portion 11b. Introduction element and shift rod are consequently formed integrally.

By means of an axial motion (see double arrow 16), the axial position of a sliding sleeve of a selected gear can be changed via a shift finger 17 which engages in a recess of a shift fork (not shown), in which case this selected gear is then shifted. Furthermore, a guide pin 18 is formed on the shift rod 11, which engages in a guide rail (not shown).

The shift rod 11 can also be rotated about its longitudinal axis, which is indicated by the double arrow 19. Rotation of the shift rod 11 changes the position or height of the shift finger 17, as a result of which the shift finger 17 can be brought into engagement with different shift forks. A different shift fork, a different sliding sleeve and thus a different gear can thus be selected by the rotation of the shift rod 11. If this other gear is selected by rotating the shift rod 11, the gear can be shifted by axially displacing 16 the shift rod 11. Since gears can also be selected by the shift rod 11, it can also be referred to here as a shift selector rod. Due to the interaction of the guide pin 18 and the fixed guide rail, only certain positions of the shift rod with respect to the axial position and angle of rotation are permitted.

The shifting device 10 furthermore has a connecting element 20 which connects an outer shifting mass 21, here consisting of a partial mass 21a and a partial mass 21b, to the shift fork 11. The connecting element 20 has a flange 22 through which the connecting element 20 can be attached to the housing 1.

In FIG. 1, an outer part of the connecting element 20 with the partial masses 21a and 21b and the flange 22 can be seen. The flange 22 covers a second opening 6 through which a rotating rod 23 of the connecting element 20 engages. At one end in the interior, the rotating rod 23 is connected in a rotationally fixed manner to a crank web 24 which carries a pin 25. The pin 25 engages in a U-shaped mouth 26 which is attached to the shift rod 11. An axial displacement 16 of the shift rod 11 leads to a rotation of the connecting element 20 about an axis of rotation designated 27 by the interaction of the pin 25 and the U-shaped mouth 26. Due to their radial spacing, the partial masses 21a, 21b cause a rotational moment of inertia, as a result of which the shifting motion (axial displacement 16) of the shift rod 11 is associated with a certain inertia, by means of which force peaks occurring during shifting can be better overcome.

The external actuating force for shifting a gear and the external actuating force for selecting the gears are directed via the spherical head (12) through the first opening 5 of the housing 1 into the interior space of the gearbox. The provision of a shifting mass 21 and its connection to the shift rod 11 takes place through the second opening, which is different from the first opening 5 and is also arranged on another outer surface of the housing 1. While the first opening 5 is located at the output-side end 3, the second opening 6 is arranged between the end 3 and the motor-side end 2 on a side surface 7 of the gearbox 1.

LIST OF REFERENCE NUMERALS 1 housing
2 motor-side end
3 output-side end
4 output
5 first opening
6 second opening
7 side surface
10 shifting device 11 shift rod
11a outer rod portion/first introduction element
11b inner rod portion
12 spherical head (receiving part)
13 bearing
14 bearing
15 bearing
16 double arrow (axial displacement)
17 shift finger
18 guide pin
19 double arrow (direction of rotation)
20 connecting element
21 shifting mass
21a partial mass
21b partial mass
22 flange
23 rotary rod
24 crank web
25 pin
26 U-shaped mouth

What is claimed is:

1. A manual gearbox for a motor vehicle, comprising:
a plurality of gears,
a housing,
an interior space which is enclosed by the housing,
at least one gearshift clutch located in the interior space, through which a gear can be shifted, and
a shifting device which serves to direct an external actuating force acting outside the housing for shifting to the at least one gearshift clutch, the shifting device including:
  at least one inner shifting part located in the interior space,
  a first introduction element which engages through a first opening provided in the housing and serves to guide the external actuating force to shift the gear to the at least one inner shifting part,
  a shifting mass arranged outside the housing which is moved during gear shifting, and
  a connecting element which is different from the first introduction element with which the shifting mass is connected to the at least one inner shifting part, the connecting element engaging through a second opening in the housing, which differs from the first opening in the housing, into the interior space,
wherein said at least one inner shifting part is designed as one of the following:
  a shift rod or
  at least an inner rod portion of a shift rod,
wherein the shifting device is designed such that an axial displacement of the shift rod results in a rotation of the connecting element and to a rotary motion of the shifting mass,
wherein the first introduction element has a receiving part for the external actuating force for shifting the gear, and
wherein an external actuating force for selecting a different gear is adapted to also be introduced in the receiving part.

2. The gearbox according to claim 1,
wherein the housing has an approximately cylindrical basic shape with a first end face, a second end face and a lateral surface, and
wherein one of the two openings is arranged on the first end face and the other of the two openings is arranged on the lateral surface.

3. The gearbox according to claim 1, wherein the first introduction element and the inner rod portion are integrally formed.

* * * * *